(12) United States Patent
Verkama et al.

(10) Patent No.: US 7,751,379 B2
(45) Date of Patent: Jul. 6, 2010

(54) IP MOBILITY MECHANISM FOR A PACKET RADIO NETWORK

(75) Inventors: Markku Verkama, Helsinki (FI); Patrik Flykt, Helsinki (FI); Serge Haumont, Helsinki (FI)

(73) Assignee: Nokia Networks Oy, Espoo (FI)

( * ) Notice: Subject to any disclaimer, the term of this patent is extended or adjusted under 35 U.S.C. 154(b) by 18 days.

(21) Appl. No.: 11/967,877

(22) Filed: Dec. 31, 2007

(65) Prior Publication Data

US 2008/0101348 A1 May 1, 2008

Related U.S. Application Data

(63) Continuation of application No. 09/787,659, filed as application No. PCT/FI99/00774 on Sep. 20, 1999, now abandoned.

(30) Foreign Application Priority Data

Sep. 21, 1998 (FI) .................. 982027

(51) Int. Cl.
- H04W 4/00 (2009.01)
- H04L 12/66 (2006.01)
- H04L 12/28 (2006.01)

(52) U.S. Cl. .............. 370/338; 370/352; 370/401; 455/435.1

(58) Field of Classification Search ........... 370/331, 370/338, 389, 401, 352–356; 455/435.1, 455/432.1, 433
See application file for complete search history.

(56) References Cited

U.S. PATENT DOCUMENTS

| 5,708,655 A | 1/1998 | Toth et al. |
| 5,793,762 A | 8/1998 | Penners et al. |
| 5,978,386 A | 11/1999 | Hamalainen et al. |
| 6,137,791 A | 10/2000 | Frid et al. |
| 6,230,012 B1 | 5/2001 | Willkie et al. |
| 6,396,828 B1 | 5/2002 | Liu |
| 6,407,988 B1 | 6/2002 | Agraharam et al. |

(Continued)

FOREIGN PATENT DOCUMENTS

| WO | 9621983 | 7/1996 |

(Continued)

OTHER PUBLICATIONS

C.Perkins, Editor, "IP Mobility Support," RFC 2002 Standards Track, Internet, Engineering Task Force (IETF), pp. 1-79, (Oct. 1996).

(Continued)

*Primary Examiner*—Nittaya Juntima
(74) *Attorney, Agent, or Firm*—Pillsbury Winthrop Shaw Pittman, LLP

(57) ABSTRACT

An arrangement for providing IP mobility for a mobile station (MS) provides a care-of-address (COA) for routing data packets when the MS is away from home. In one embodiment, the arrangement includes support nodes, called gateway GPRS support nodes (GGSN) or serving GPRS gateway support nodes (SGSN), and a foreign agent (FA) having an IP address. In order to save IP addresses and radio resources, the FA is integrated into one of the support nodes (e.g., the SGSN), and the IP address of, or an IP address provided by the FA is also used as the MS COA.

14 Claims, 2 Drawing Sheets

U.S. PATENT DOCUMENTS

| | | |
|---|---|---|
| 6,496,704 B2 | 12/2002 | Yuan |
| 6,535,493 B1 | 3/2003 | Lee et al. |
| 6,636,502 B1 * | 10/2003 | Lager et al. ............... 370/352 |
| 6,711,147 B1 | 3/2004 | Barnes et al. |
| 6,728,208 B1 | 4/2004 | Puuskari |
| 6,904,025 B1 | 6/2005 | Madour et al. |
| 6,937,566 B1 | 8/2005 | Forslow |
| 6,980,801 B1 | 12/2005 | Soininen et al. |
| 7,023,825 B1 | 4/2006 | Haumont et al. |
| 7,039,404 B2 | 5/2006 | Das et al. |
| 7,058,077 B1 | 6/2006 | Guo et al. |
| 2004/0120294 A1 | 6/2004 | Yang et al. |

FOREIGN PATENT DOCUMENTS

| | | |
|---|---|---|
| WO | 97/26739 | 7/1997 |
| WO | 9843446 | 1/1998 |
| WO | 9832301 | 7/1998 |
| WO | 9840988 | 9/1998 |
| WO | 00/18155 | 3/2000 |

OTHER PUBLICATIONS

C. Perkins, Editor, "Minimal Encapsulation for IP," RFC 2004 Standards Track, Internet Engineering Task Force (IETF), pp. 1-6, (Oct. 1996).

J. Solomon and S. Glass, "Mobile IPv4 Configuration Option for PPP IPCP," RFC 2290, Standards Track, Internet Engineering Task Force (IETF), pp. 1-17, (Feb. 1998).

Geiger et al., "Wireless Network Extension Using Mobile IP," Proceedings of COMPCON '96, pp. 9-14.

Office Action drafted Mar. 9, 2009 in JP2000-571685.

* cited by examiner

IP MOBILITY MECHANISM FOR A PACKET RADIO NETWORK

CROSS-REFERENCE TO RELATED APPLICATIONS

This application claims benefit under 35 U.S.C. §120 to application Ser. No. 09/787,659 filed on May 7, 2001, now abandoned. Application Ser. No. 09/787,659 is a national stage entry under 35 U.S.C. §371 of International Application PCT/FI99/00774 filed on Sep. 20, 1999. International Application PCT/FI99/00774 claims priority to Finnish application 982027 filed on Sep. 21, 1998. The entire contents of each of these applications are incorporated herein by reference.

BACKGROUND

This disclosure relates to a mechanism for providing mobility for an Internet-type protocol in a packet radio network such as General Packet Radio Service (GPRS) or Universal Mobile Telecommunications System (UMTS). An example of such an Internet-type mobility protocol is the IP mobility (IP=Internet Protocol), which is the topic of standards RFC2002 to RFC2004 and RFC2290 by the Internet Engineering Task Force (IETF). These RFC standards are incorporated herein by reference. In short, IP mobility is a mechanism for providing a mobile user with telecommunications capability using an IP address. It enables mobile nodes to change their points of attachment in the Internet without changing their IP address. Thus it facilitates the communication of a mobile node and a correspondent host with the mobile node's home address. FIG. 1 illustrates some elements of a packet radio network which are relevant to one or more embodiments.

Within the context of this application, "Network Access Server" (NAS) is a device providing users with temporary, on-demand network access. This access is point-to-point using telephone, ISDN or cellular connections, etc. "Mobile Node" (MN) refers to a host that wants to use a Home Network address while physically connected by a point-to-point link (phone line, ISDN, etc.) to a NAS that does not reside on the Home Network. Mobile Station" (MS) is a mobile node having a radio interface to the network. A "Tunnel" is the path followed by a datagram when encapsulated. The model of a tunnel is such that, while encapsulated, a datagram is routed to a known decapsulation agent, which decapsulates the datagram and then correctly delivers it to its ultimate destination. Each mobile node connecting to a home agent does so over a unique tunnel, identified by a tunnel identifier which is unique to a given Foreign Agent/Home Agent pair.

A "Home Network" is the IP network to which a user logically belongs. Physically, it can be e.g., a local area network (LAN) connected via a router to the Internet. A "Home Address" is an address that is assigned to a mobile node for an extended period of time. It may remain unchanged regardless of where the MN is attached to the Internet. Alternatively, it could be assigned from a pool of addresses. A "Home Agent" is a routing entity in a mobile node's home network which tunnels packets for delivery to the mobile node when it is away from home, and maintains current location information for the mobile node. The home agent tunnels datagrams for delivery to, and, optionally, detunnels datagrams from, a mobile node when the mobile node is away from home.

A "Foreign Agent" refers to a routing entity on a mobile node's visited network which provides routing services to the mobile node while registered, thus allowing a mobile node to utilize its home network address. The foreign agent detunnels and delivers packets to the mobile node that were tunnelled by the mobile node's home agent. For datagrams sent by a mobile node, the foreign agent may serve as a default router for registered mobile nodes.

RFC2002 defines "Care-of-Address" (COA) as the termination point of a tunnel toward a mobile node, for datagrams forwarded to the mobile node while it is away from home. The protocol can use two different types of care-of-address: a "foreign agent care-of-address" is an address announced by a foreign agent with which the mobile node is registered, and a "co-located care-of-address" is an externally obtained local address which the mobile node has acquired in the network. Within the context of this application, "Care-of-Address" (COA) is an announced address of a foreign agent with which the mobile node is registered. An MN may have several COAs at the same time.

An MN's COA is registered with its "Home Agent" (HA). The list of COAs is updated when the mobile node receives advertisements from foreign agents. If an advertisement expires, its entry or entries should be deleted from the list. One foreign agent can provide more than one COA in its advertisements. "Mobility Binding" is the association of a home address with a care-of-address, along with the remaining lifetime of that association. An MN registers its COA with its HA by sending a Registration Request. The HA replies with a Registration Reply and retains a binding for the MN.

Routing data packets to an MN is a problem in a packet radio network, such as GPRS. This is because the data network address of the MN typically has a static routing mechanism, whereas a MN can roam from one subnetwork to another. One approach for data packet routing in a mobile environment is the concept of Mobile IP. Mobile IP enables the routing of IP datagrams to mobile hosts, independent of the point of attachment in the subnetwork. The standard Mobile IP concept does not fit exactly in the GPRS environment because network protocols other than IP must be supported too.

Also, mobility management within a GPRS network is based on mechanisms different from Mobile IP, which is only defined for the Internet Protocol.

The GPRS infrastructure comprises support nodes such as a "gateway GPRS support node" (GGSN) and a "serving GPRS gateway support node" (SGSN).

The main functions of the GGSN nodes involve interaction with the external data network. The GGSN updates the location directory using routing information supplied by the SGSNs about an MS's path and routes the external data network protocol packet encapsulated over the GPRS backbone to the SGSN currently serving the MS. It also decapsulates and forwards external data network packets to the appropriate data network and handles the billing of data traffic.

The main functions of the SGSN are to detect new GPRS mobile stations in its service area, handle the process of registering the new MSs along with the GPRS registers, send/receive data packets to/from the GPRS MS, and keep a record of the location of the MSs inside of its service area.

The subscription information is stored in a GPRS "Home Location Register" (HLR) where the mapping between a mobile's identity (such as MS-ISDN or IMSI) and the PSPDN address is stored. The GPRS register acts as a database from which an SGSN can ask whether a new MS in its area is allowed to join the GPRS network.

The GPRS gateway support nodes GGSN connect an operator's GPRS network to external systems, such as other operators' GPRS systems, data networks 11, such as an IP network (Internet) or an X.25 network, and service centers. Fixed hosts 14 can be connected to the data network 11 e.g. by means of a local area network LAN and a router 15. A border gateway BG provides access to an inter-operator GPRS backbone network 12. The GGSN may also be connected directly to a private corporate network or a host. The GGSN includes GPRS subscribers' "Packet Data Protocol" (PDP) addresses and routing information, i.e. SGSN addresses. Routing information is used for tunneling protocol data units PDU from the data network 11 to the current switching point of the MS, i.e. to the serving SGSN. The functionalities of the SGSN and GGSN can be connected to the same physical node.

The home location register HLR of the GSM network contains GPRS subscriber data and routing information and it maps the subscriber's "International Mobile Subscriber Identity" (IMSI) into one or more pairs of PDP type and PDP address. The HLR also maps each PDP type and PDP address pair into a GGSN node. The SGSN has a Gr interface to the HLR (a direct signaling connection or via an internal backbone network 13). The HLR of a roaming MS and its serving SGSN may be in different mobile communication networks.

The intra-operator backbone network 13, which interconnects an operator's SGSN and GGSN equipment, can be implemented, for example by means of a local network, such as an IP network. It should be noted that an operator's GPRS network can also be implemented without the intra-operator backbone network, e.g., by providing all features in one computer.

A GPRS network in its current form is able to support IP mobility if an MS implements the Mobile IP protocol and if it has a private IP address assigned by some company or internet service provider (ISP). When a GGSN node assigns a temporary IP address to the MS, the MS can use this temporary address as its care-of-address (COA) and register the address with its home agent, thus benefiting from the Mobile IP services. This is also true when the MS is using a predefined GGSN IP address, which can also be regarded as a COA.

A problem of the temporary and predefined GGSN-assigned IP addresses in the known IP mobility mechanisms is that they consume valuable IPv4 address space because an MS requires two IP addresses, one from its home network and another one from the visited network. Moreover, the tunneling requires that IP packets are sent to the MS using Mobile IP encapsulation, which wastes precious radio resources.

SUMMARY

Among other aspects, an object of one or more embodiments of this disclosure is to solve or at least minimize the problems associated with conventional IP mobility mechanisms.

Aspects of this disclosure are based on the vision that a foreign agent is integrated or consolidated into a support node of a packet radio network. In a GPRS network, suitable support nodes are the gateway nodes (GGSN) and the access nodes (SGSN). In so-called third-generation (3G) systems, the SGSN nodes are sometimes referred to as 3G-SGSN nodes. This integration or consolidation is not simple physical co-location, but something more fundamental, wherein the MS can use the foreign agent's care-of-address COA.

Thus the MS will not need (consume) any additional IP addresses from the visited network.

Another advantage of the fundamental integration relates to the time-to-live field of IP datagrams. IP datagrams comprise a time-to-live field which is decremented by one when the datagram is routed by a router or tunnelled by a host (or a GGSN) to a new destination. (The time-to-live field is also called a hop count or a hop limit.) There are two mechanisms by which an MS may gain knowledge of the services offered by an FA. The FA can declare its services using advertisement messages or the MS can send inquiries called agent solicitation messages. These advertisement messages and agent solicitation messages are ordinary IP datagrams with the time-to-live field set to one. If the FA were a separate network element or simply co-located with a support node (GGSN or SGSN), the support node would have to decrement the time-to-live field to zero and then discard the datagram and generate an ICMP (Internet Control Message Protocol) error message upon reception of an agent advertisement message or agent solicitation message. Therefore the FA should be deeply integrated into the support node in a way which does not interfere with the datagrams' time-to-live calculations. In other words, the FA can be said to be integrated into the support node if the support node, which receives a datagram addressed to the FA with a time-to-live field set to one, can forward the datagram to the FA.

A further advantage of aspects of this disclosure is that Mobile IP support becomes a service provided by the network operator. Thus the operator can also charge the users for this service.

In order for the MS to keep the existing Mobile IP binding with its home agent, the MS has to reregister with its home agent before the connection times out. The foreign agent or SGSN/GGSN could be thought to perform the re-registration on behalf of the MS (in order to save air interface resources). This is, however, impossible because the MS authenticates the registration messages by using a secret key shared between itself and its home agent. Therefore, neither the FA nor the SGSN/GGSN can do the (re) registration on behalf of the MS, because they do not know the key.

According to a first embodiment, the foreign agent is integrated into an SGSN node. According to a second embodiment, the foreign agent is integrated into a GGSN node.

BRIEF DESCRIPTION OF THE DRAWINGS

This disclosure will be described in more detail by means of various embodiments with reference to the appended drawing on which.

DETAILED DESCRIPTION

Figure 1:
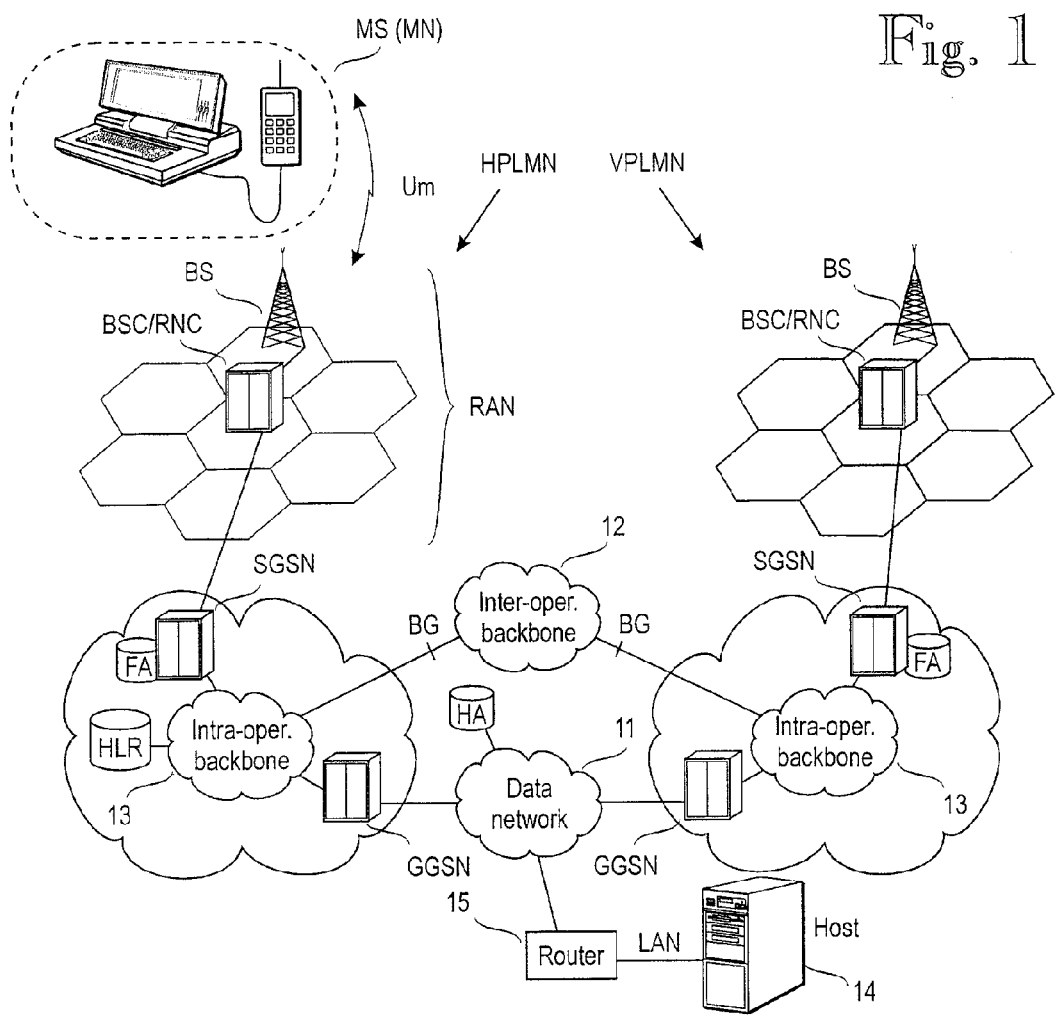
FIGS. 1 and 2 are block and signaling diagrams, respectively, illustrating an IP mobility mechanism according to an embodiment of this disclosure.

FIG. 1 is block diagram illustrating an IP mobility mechanism according to an embodiment of this disclosure wherein the foreign agent FA is integrated into an SGSN or a 3G SGSN, commonly referred to as an access node. The MS can be a laptop computer PC connected to a packet radio enabled cellular telephone. Alternatively, the MS can be an integrated combination of a small computer and a packet radio telephone, similar in appearance to the Nokia Communicator 9000 series. Yet further embodiments of the MS are various pagers, remote-control, surveillance and/or data-acquisition devices, etc.

The Radio Access Network RAN can be a part of a GPRS system or a third generation (3G) system, such as UMTS. The RAN comprises an air interface Um which is a performance bottleneck. Subscriber information is stored permanently in the Home Location Register HLR.

To cover the entire area of the network, foreign agents FA may be installed in every access node SGSN. Each FA has an IP address in the Internet and in the operator's own private GPRS/3G backbone network. For each access node/FA, a permanent packet data context exists in the corresponding gateway node GGSN to enable tunneling towards the FA. One of the link protocols between an MS and the access node (e.g., Layer 3 Mobility Management, L3-MM) is modified to support IP mobility.

Figure 2:
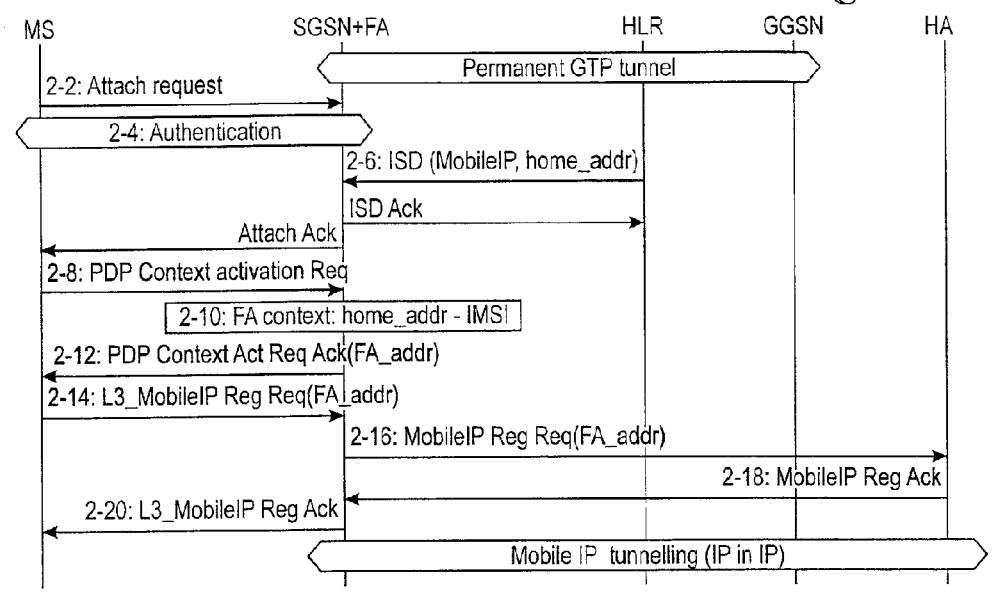

Reference is now made to FIG. 2. The user of a mobile station MS subscribes to a special Mobile IP service. The subscription information is stored in the Home Location Register HLR together with the user's home IP address. There is a permanent "GPRS Tunneling Protocol" (GTP) tunnel between the SGSN/FA and the GGSN. This tunnel can be configured by network management. In step 2-2 the MS attaches to the packet radio network. In step 2-4 the user of the MS is authenticated, which involves querying subscriber security information from the HLR. In step 2-6, the subscriber information indicates that the MS relates to a mobile subscriber, i.e., a Mobile IP user. The subscriber information also comprises the user's home address. Alternatively, this information could be provided by the MS in the attach request or context activation request message. After the attach procedure, in step 2-8, the MS (or its user) initiates PDP context activation for the IP protocol. In step 2-10 the SGSN/FA creates a context for the MS. The context is created on the basis of the MS's home address and its 1MS1. In the PDP context activation acknowledgement message 2-12, the SGSN/FA sends the FA's IP address to the MS. The FA's IP address belongs topologically to the operator's IP network. More precisely, the FA's IP address is such that IP packets destined to that address are routed in the Internet to the GGSN that has the permanent packet data context corresponding to the FA. Having received the acknowledgement, in step 2-14, the MS initiates Mobile IP registration to its home agent HA by sending a Mobile IP Registration Request message to the SGSN/FA. The message from the MS to the FA can be sent on the LLC (Logical Link Control) or SNDCP (Subnetwork Dependent Convergence Protocol) layer. It could also be part of modified L3-MM.

Inside the SGSN/FA, the message is forwarded to the FA section (involving no IP routing or time-to-live calculations between the SGSN and the FA). Next, in step 2-16, the FA relays the registration request to the HA (using e.g., UDP/IP, UDP=User Datagram Protocol). In step 2-18, the HA sends a registration reply to the FA which, in step 2-20, finally forwards it to the MS. After step 2-20, there is a Mobile IP tunnel from the SGSN/FA to the HA. If the particular implementation of Mobile IP uses reverse tunneling, the tunnel exists also in the reverse direction.

Figure 3:
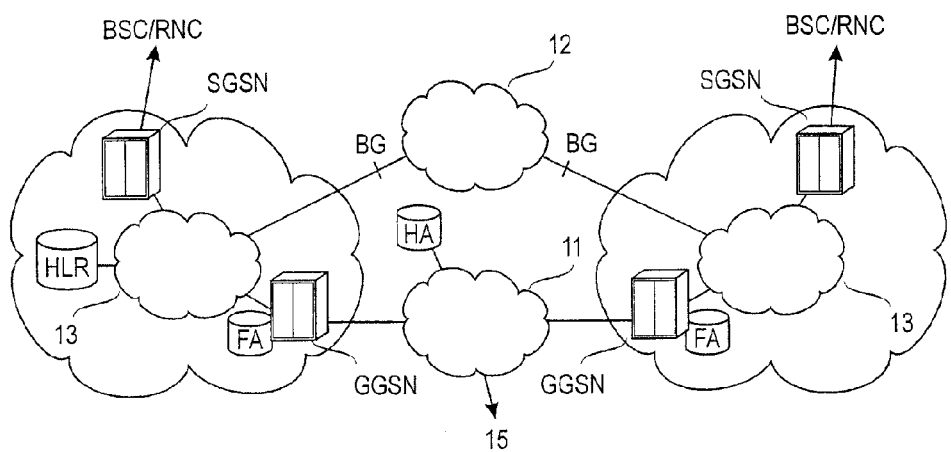
FIGS. 3 and 4 are block and signaling diagrams, respectively, illustrating an IP mobility mechanism according to another embodiment of this disclosure.

According to another embodiment as shown in FIG. 3, the foreign agent FA is integrated into a GGSN, commonly referred to as a gateway node. In this case the MS uses as its COA the address of the FA in the gateway node. In order to establish mobility binding, the MS has to send additional information to the access node (SGSN). Because of this additional information, the selected gateway node knows that a received IP address is valid although it does not belong to this particular gateway node. The gateway node detects registration messages from the MS and sends them to its FA unit for processing. Moreover, the gateway node GGSN/SGSN can accept any IP address from the MS and use the address of the FA as the MS's COA.

As a practical example of the additional information, an access point name (APN) could be used. The APN indicates the operator's name and a Mobile IP address. It is a logical name which the MS sends to the access node and which the access node in turn sends to the gateway node. The access node uses the APN to select a particular gateway node and the gateway node in turn uses it to select a particular ISP. Thus the APN is used for requesting the services of a particular gateway node.

Figure 4:
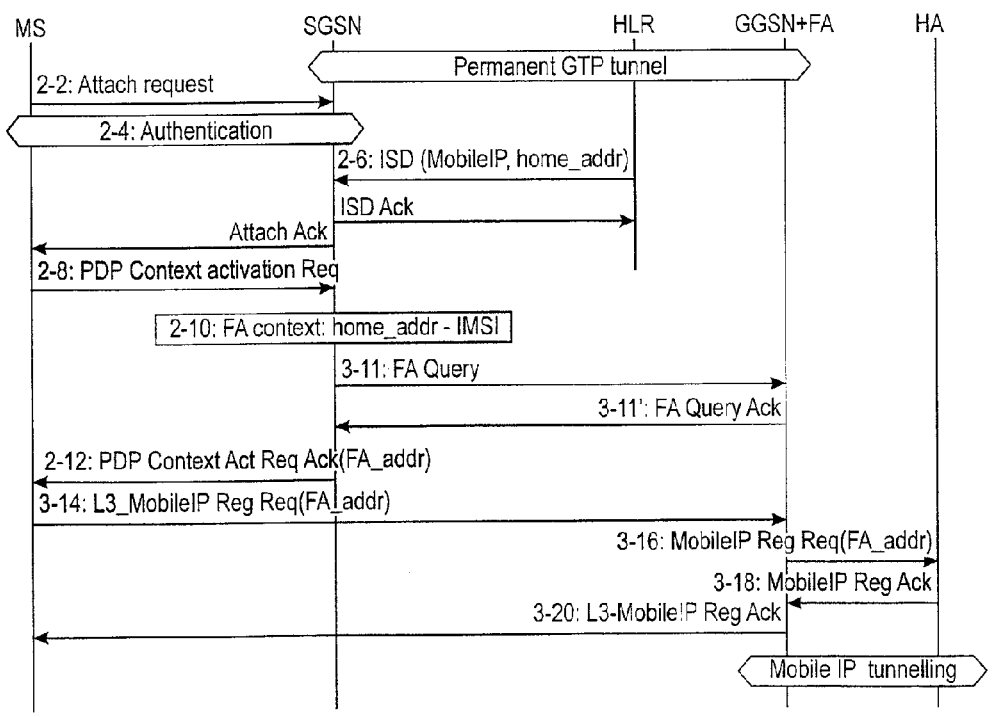

FIG. 4 is a signaling diagram illustrating another embodiment. Signaling steps having identical reference numbers with those in FIG. 2 have identical functions, and they will not be described again. The major difference between the embodiments shown in FIGS. 2 and 4 is, of course, that in FIG. 4 the FA is integrated into the GGSN instead of the SGSN.

Therefore, in step 3-11, the SGSN sends an FA Query to the GGSN+FA. This query is acknowledged in step 3-11'. Steps 3-14 to 3-20 correspond to respective steps 2-14 to 2-20, but they are sent to/from the GGSN, instead of the SGSN. Similarly, the Mobile IP tunnel is established from the GGSN+FA to the HA, and the implementation permitting, also in the reverse direction.

The description only illustrates various embodiments, but is not limited to these examples or the terms used, but may vary within the scope of the appended claims.

What is claimed is:

1. A method for providing Internet Protocol mobility service for a mobile station in a packet radio network, the method comprising:
    coupling the packet radio network to a data network implementing an Internet Protocol;
    integrating, into a support node of the packet radio network, a foreign agent having an Internet Protocol address;
    the support node receiving service request information from the mobile station in connection with an attach procedure, said service request information comprising an access point name implemented as a logical name comprising an operator's name and a Mobile IP address, the service request information being used by the support node to select services of a the support node in the packet radio network; and
    providing a care-of-address for the mobile station by using the Internet Protocol address of the foreign agent as the mobile station's care-of-address.

2. The method of claim 1, wherein the support node comprises a Gateway GPRS Support Node (GGSN) node.

3. The method of claim 1 wherein the access point name is received by the support node and the method further comprises sending the access point name received from the mobile station to the support node to select a particular Internet Service Provider.

4. The method of claim 1, further comprising receiving the access point name from the mobile station, in connection with a packet data protocol context activation request.

5. The method of claim 1, further comprising storing information concerning whether the mobile station in the packet radio network is allowed to use the Internet Protocol mobility service in a register of the packet radio network.

6. The method of claim 5, wherein the register of the packet radio network comprises a Home Location Register.

7. The method of claim 1, further comprising receiving information from the mobile station indicating whether the mobile station requests use of the Internet Protocol mobility service.

8. The method of claim 7, wherein the receiving information from the mobile station indicating whether the mobile station requests use of the Internet Protocol mobility service is performed in connection with mobile station registration.

9. An arrangement for providing Internet Protocol mobility service for a mobile station, the arrangement comprising:

at least two support nodes, wherein at least one support node is a gateway node, and at least one support node is an access node; and a foreign agent having an Internet Protocol address being integrated into one of the at least two support nodes;

wherein the Internet Protocol address of the foreign agent is established as a care-of-address of the mobile station;

wherein at least one support node is configured to receive an access point name from the mobile station, the access point name being a logical name comprising an operator's name and a Mobile IP address used to request a particular Internet Service Provider through a particular gateway.

10. The arrangement of claim 9, wherein the foreign agent is integrated into a Gateway GPRS Support Node (GGSN) node.

11. A support node for a packet radio network, arranged to provide mobility service for a mobile station, the support node comprising:

processing means; and an integrated foreign agent having an Internet Protocol (IP) address, wherein the processing means is configured to support at least the Internet Protocol and to use either the IP address of the foreign agent or another IP address provided by the foreign agent as a care-of-address of the mobile station, and wherein the processing means is configured as a gateway node configured to receive an access point name from the mobile station, the access point name being a logical name comprising an operator's name and a Mobile IP address used to request a particular Internet Service Provider.

12. The support node of claim 11, wherein said processing means is configured to receive the access point name from the mobile station in connection with execution of an attach procedure.

13. The support node of claim 11, wherein said processing means is configured to receive the access point name from the mobile station in connection with a packet data protocol context activation procedure.

14. The support node of claim 11, wherein said processing means is configured as a Gateway GPRS Support Node (GGSN).

* * * * *